United States Patent [19]

Suh et al.

[11] Patent Number: 6,013,759
[45] Date of Patent: Jan. 11, 2000

[54] POLYAMIDEIMIDE FOR OPTICAL COMMUNICATIONS AND METHOD FOR PREPARING THE SAME

[75] Inventors: Dong-hack Suh, Daejeon; Eun-young Chung, Chungcheongnam-do; Tae-hyung Rhee, Sungnam, all of Rep. of Korea

[73] Assignee: SamSung Electronics Co., Ltd., Kyungki-do, Rep. of Korea

[21] Appl. No.: 09/206,230

[22] Filed: Dec. 7, 1998

[30] Foreign Application Priority Data

Dec. 8, 1997 [KR] Rep. of Korea ............ 97-66743

[51] Int. Cl.[7] ............... C08G 73/14; C08G 69/26
[52] U.S. Cl. ............... 528/350; 528/125; 528/128; 528/170; 528/172; 528/173; 528/174; 528/185; 528/220; 528/229; 528/310; 528/322; 528/332; 528/353
[58] Field of Search ............... 528/125, 128, 528/170, 322, 173, 174, 188, 220, 229, 332, 350, 353, 340

[56] References Cited

U.S. PATENT DOCUMENTS

| 3,988,374 | 10/1976 | Brode et al. | 528/380 |
| 5,521,276 | 5/1996 | Choi et al. | 528/322 |
| 5,532,334 | 7/1996 | Choi et al. | 528/350 |

FOREIGN PATENT DOCUMENTS

| 0 385 305 | 5/1990 | European Pat. Off. . |
| 1 404 667 | 9/1975 | United Kingdom . |

*Primary Examiner*—P. Hampton-Hightower
*Attorney, Agent, or Firm*—Robert E. Bushnell, Esq.

[57] ABSTRACT

A polyamideimide for optical communications, having a minimum optical loss in a near infrared light wavelength range, high thermal resistance and good film processibility, and a method for preparing the same are provided. The polyamideimide is very useful as an optical material in the optical communications field adopting the light of near infrared light wavelength.

14 Claims, No Drawings

POLYAMIDEIMIDE FOR OPTICAL COMMUNICATIONS AND METHOD FOR PREPARING THE SAME

CLAIM OF PRIORITY

This application makes reference to, incorporates the same herein, and claims all benefits accruing under 35 U.S.C. §119 from an application for POLYAMIDEIMIDE FOR OPTICAL COMMUNICATIONS AND METHOD FOR PREPARING THE SAME earlier filed in the Korean Industrial Property Office on the 8th of Dec. 1997 and there duly assigned Ser. No. 66743/1997.

BACKGROUND OF THE INVENTION

1. Field of the Invention

The present invention relates to an optical polymer composition, and more particularly to a composition for use in optical communications.

2. Description of the Related Art

A wavelength range of light of interest in optical communications has shifted from 800 nm to 1,550 nm, which belongs to the near infrared wavelength range. Thus, it is extremely desirable to manufacture an optical communication device using a material which minimally absorbs light of wavelengths in the near infrared wavelength range.

In general, for an optical lens or an optical substrate such as a compact disk a polymer is used. Research is currently being conducted into use of such a polymer as a material for an optical waveguide for light propagation in the near infrared wavelength range.

However, most polymers absorb light of 1,000–1,700 nm which correspond to the near infrared wavelength range. Such absorption of near infrared wavelength by the polymer is caused by overtone of harmonics due to stretching and deformation vibrations of carbon to hydrogen bonds (C—H) in alkyl, phenyl and other similar functional groups. Thus, using a conventional polymer as a material for an optical waveguide in the near infrared wavelength range results in a large optical loss. In order to reduce optical loss, the light absorption wavelength of the polymer should be shifted from the near infrared light wavelength region to a longer or shorter wavelength region. To this end, the method of substituting hydrogen of the carbon and hydrogen (C—H) bond by fluoride (F) or heavy hydrogen (D) has been suggested.

The method of substituting the hydrogen of C—H bond by D does not yield a material suitable for an optical communications device at the wavelength of 1,500 nm because the material having carbon and heavy hydrogen (C—D) bond absorbs much light of 1,500 nm. On the other hand, the method of substituting the hydrogen by F can minimize optical loss in light absorption at a wavelength of 1,000–1,700 nm.

Another requirement of an optical material for manufacturing an optical device such as an opto-electronic integrated circuit (OEIC), an opto-electrical mixed wiring board (OEMWB), a hybrid integration device, a plastic optical fiber or a multi-chip module (MCM) is thermal stability at 250° C. lasting at least for 30 minutes. Because such thermal resistance of the optical material is very important, glass transition temperature, thermal decomposition temperature, thermal expansion coefficient and birefrigence of the optical material should be carefully considered.

Polyimide has been well known as a polymer having excellent thermal stability. Since polyimide is stable at a high temperature of about 400° C., great efforts to utilize polyimide as a material for optical communications have been consistently made. However, generally, since a conventional polyimide has many C—H bonds in its molecule structure, it exhibits a large optical absorption loss in the near infrared region. To overcome this problem, recently, a method in which hydrogen in C—H bonds of a polyimide is partially or entirely substituted by fluoride has been proposed.

However, if hydrogen is substituted by fluorine, the refractive index of the polymer is decreased. Here, the content of fluoride in the polymer is proportional to the decrease in the value of the refractive index. Thus, since a polyimide obtained by substituting hydrogen in the C—H bonds by fluoride, that is, a fluorinated polyimide, has a low refractive index, in the case of using the same as a core, the range of selection of materials capable of being used for cladding becomes narrow.

Also, the higher the content of fluoride in the polyimide is, the lower the surface tension of a composition containing the polyimide is. Thus, it is difficult to coat such a composition on a substrate and the adhesion of a film comprised of the composition is poor. As a result, film characteristics are deteriorated and the film formed thereby is very fragile.

SUMMARY OF THE INVENTION

Therefore it is an object to the president mentioned to provide improved optical polymer material.

It is a further object of the present invention to provide an improved optical polymer material for use with near infrared light.

It is a still further object to provide an optical polymer material with low light loss at near infrared wavelengths.

It is a yet further object to provide an optical material with high thermal stability.

It is a still yet further object to provide an optical material with a suitable refractive index for use in an optical fiber.

It is another object to provide an optical material with suitable adhesion characteristics for preparation of optical films.

It is yet another object to provide an optical material with excellent processing characteristics and robustness.

To achieve the above objects, the present invention provides polyamideimides for optical communications, which have a minimum optical loss in a near infrared light wavelength range, high thermal stability at a temperature of 200° C. or higher and good film processibility. In addition, the present invention provides a method for preparing the polyamideimides for use in optical communications.

Specifically, there are provided polyamideimides comprising a monomer represented by the formula (1) as a repeating unit:

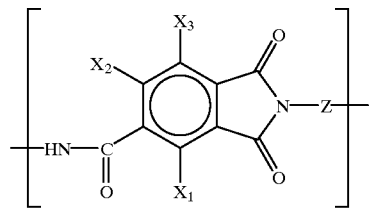

(1)

wherein $X_1$, $X_2$ and $X_3$ are independently selected from the group consisting of halogen atom, halogenated alkyl group, halogenated aromatic ring group, —NO$_2$, —OR$^1$ and —SR$^1$, and (where R$^1$ is a halogenated alkyl or halogenated aromatic ring groups), and Z is selected from the group consisting of divalent halogenated aliphatic hydrocarbon, divalent halogenated aliphatic cyclic hydrocarbon or divalent halogenated aromatic hydrocarbon. Here, divalent means that the group is a radical with two positions for bond formation.

Preferably, X$_1$, X$_2$ and X$_3$ are the same and selected from the group consisting of chlorine, partially chlorinated or perchlorinated alkyl group, partially chlorinated or perchlorinated aromatic ring group, partially chlorinated or perchlorinated alkoxy group, and partially chlorinated or perchlorinated phenoxy group.

Also, Z is preferably selected from the group consisting of divalent halogenated aliphatic hydrocarbon of C$_1$–C$_{25}$, divalent halogenated aliphatic aromatic hydrocarbon of C$_1$–C$_{25}$, and divalent halogenated aromatic hydrocarbon of C$_6$–C$_{25}$. In particular, Z is preferably represented by one of the following formulas:

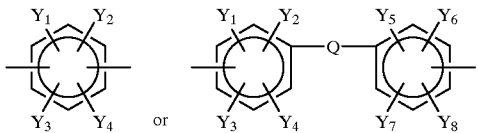

wherein Y$_1$, Y$_2$, Y$_3$, Y$_4$, Y$_5$, Y$_6$, Y$_7$ and Y$_8$ are independently selected from the group consisting of halogen atom, halogenated alkyl group, halogenated aromatic ring group, —NO$_2$, —OR$^1$ and —SR$^1$, where R$^1$ is a halogenated alkyl group or a halogenated aromatic ring group; and Q is a simple chemical bond or is selected from the group consisting of —O—, —CO—, —SO$_2$—, —S—, —(OT)$_m$, —(TO)$_m$— and —(OTO)$_m$—, (where T is a halogenated alcylene or halogenated arylene group and m is an integer from 1 to 10). The formulation above indicates that the substitution isomerism around the benzene rings is unspecified.

To achieve the objects of the invention, there is additionally provided a method for preparing a polyamideimide for optical communications, comprising the steps of:

(a) reacting 3,5,6-trialkyl-4-halogenformyl-1,2-phthalic acid anhydride, A, with diamine compound, B, at –20~–50° C., and then precipitating the reaction mixture using distilled water or an organic solvent, to obtain polyamideamic acid as an intermediate; and (b) imidizing the polyamideamic acid; where A and B are:

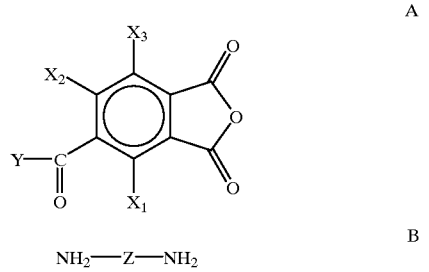

wherein X$_1$, X$_2$, and X$_3$ are independently selected from the group consisting of halogen atom, halogenated alkyl group, halogenated aromatic ring group, —NO$_2$, —OR$^1$ and —SR$^1$, where R$^1$ is a halogenated alkyl group or a halogenated aromatic ring group; Z is selected from the group consisting of divalent halogenated aliphatic hydrocarbon, divalent halogenated aliphatic cyclic hydrocarbon and divalent halogenated aromatic hydrocarbon; and Y is a halogen atom.

In step (a), 3,5,6-trialkyl-4-halogenformyl-1,2-phthalic acid compound A, is preferably reacted with diamine compound, B, at a temperature in the range of approximately 5~20° C. for a period in the range of approximately 100~230 hours. Imidization of the polyamideamic acid into the polyamideimide in the step (b) can be performed by a chemical method or a thermal method. In the chemical method, preferably, the polyamideamic acid is mixed with acetic anhydride and pyridine and then heated at 60~150° C., or toluene is added to the polyamideamic acid and then heated to a boiling point of the toluene. In the thermal method, preferably, the polyamideamic acid is heated by steps within a temperature range of 50~400° C.

DESCRIPTION OF THE PREFERRED EMBODIMENTS

In a polyamideimide of the present invention, preferably X$_1$, XX$_2$ and X$_3$ and are the same and selected from the group consisting of chlorine, partially chlorinated or perchlorinated alkyl group, partially chlorinated or perchlorinated aromatic ring group, partially chlorinated or perchlorinated alkoxy group, and partially chlorinated or perchlorinated phenoxy group.

Such a polyamideimide has a higher refractive index than a conventional polyimide containing fluorinated substituent. If the polyamideimide is used as a core in an optical device, the options for materials for a cladding of a optical device are increased. Also, problems arising in the conventional polyimide containing fluorinated substituent, that is, low adhesion and coating property on a substrate due to a low surface tension, can be solved by using the polyamideimide.

In a polyamideimide according to the present invention, light absorption is minimized in the near infrared wavelength range, specifically in the range of 1000–1700 nm which corresponds to an optical communications wavelength range, due to overtone of —OH and —CH. The polyamideimide having C—Cl bond is very useful for use in a polymer for optical waveguiding in the field of optical communications, because the optical absorption loss by the C—Cl bond is lower than that by C—F bond. Although some optical absorption loss can be generated due to overtone by —NH bond in the polyamideimide according to the present invention, at the wavelength range for optical communications, the polyamideimide with a limited number of —NH bonds existing in its molecular structure is an excellent optical material in birefringence and thermal expansion in view of its flexible molecular structure, compared to the conventional polyimide.

In a polyamideimide according to the present invention, H of C—H bond is substituted by halogen atom or nitro group. Here, the halogen atom substituting for H is not limited to a specific halogen atom, and combinations of various halogen atoms are possible.

Hereinafter, a method for preparing polyamideimide according to the present invention will be described. A method for preparing 3,6-trialkyl-4-halogenformyl-1,2-phthalic acid anhydride, A, will be described with reference to the reaction formula shown below. 1,2,4-trimethylbenzene, C, is reacted with a halogenated compound such as hydrogen bromide, hydrogen chloride or hydrogen fluoride, or a nitration agent such as nitric acid to prepare 3,5,6-trialkyl-1,2,4-trimethylbenzene, D. 3,5,6-trialkyl-1,2,4-trimethylbenzene, D, is oxidized by various oxidation methods using a transition metal catalyst, potassium permanganate or nitric acid, to obtain 3,5,6-trialkylbenzene-1,2,4-tricarboxylic acid, E. The 3,5,6- trialkylbenzene-1,2,4-tricarboxylic acid, E, is reacted with acetic acid and acetic anhydride to prepare 3,5,6-trialkyl-4-carboxylic acid-1,2-phthalic anhydride, F, and compound F is reacted with a halogenated compound such as thionyl chloride to prepare 3,5,6- trialkyl-4-halogenformyl-1,2-phthalic anhydride, A.

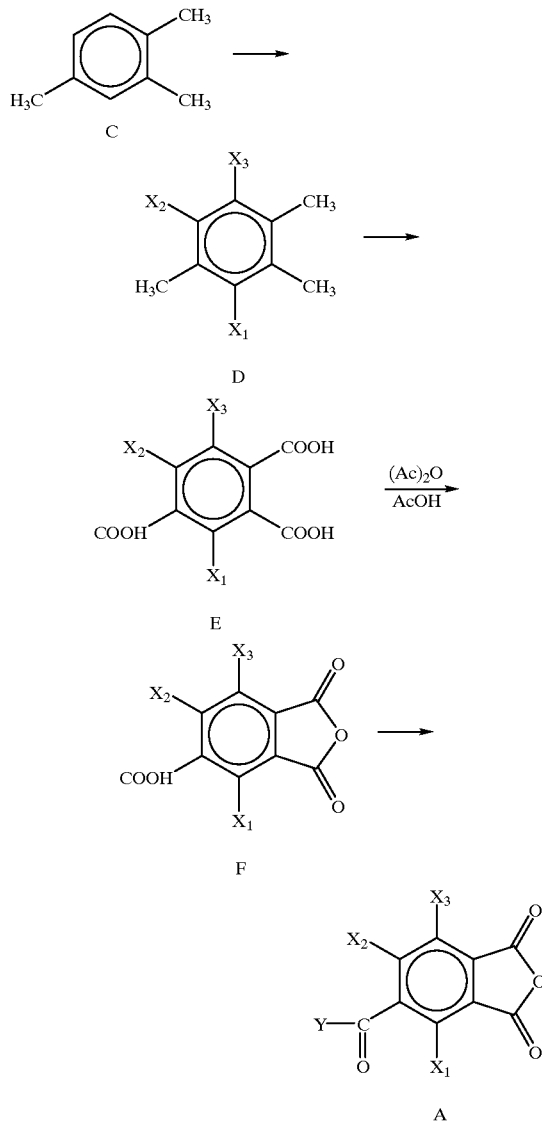

In the reaction formula, $X_1$, $X_2$ and $X_3$ are independently selected from the group consisting of halogen atom, halogenated alkyl group, halogenated aromatic ring group, $-NO_2$, $-OR^1$ and $-SR^1$ where $R^1$ is a halogenated alkyl group or a halogenated aromatic ring group, Z is selected from the group consisting of divalent halogenated aliphatic hydrocarbon, divalent halogenated aliphatic cyclic hydrocarbon or divalent halogenated aromatic hydrocarbon, and Y is a halogen atom.

The synthesis conditions of the above-described 3,5,6-trialkyl-4-halogenformyl-1,2-phthalic anhydride, A, will now be described in detail. 1,2,4-trimethylbenzene and iodine are dissolved in chloroform, a halogenated compound such as hydrogen bromide, hydrogen chloride or hydrogen fluoride, or a nitration agent such as nitric acid is added thereto, and then reacted violently at 0~40° C. for 15 minutes to 24 hours. The precipitate formed in the reaction mixture is filtered to obtain 3,5,6-trialkyl-1,2,4-trimethylbenzene.

Pyridine and water are added to the 3,5,6-trialkyl-1,2,4-trimethylbenzene and heated at 100° C., potassium permanganate is added thereto and reacted at 50~115° C. for 2 to 24 hours. While the reaction mixture is hot, it is filtered and then distilled under vacuum to remove pyridine from the reaction mixture.

Water and sodium hydroxide are added to the resultant which is then heated at 50~100° C., and potassium permanganate is added thereto and the mixture allowed to react for 2 to 24 hours. Subsequently, the resulting mixture is acidified using a 5N-HCl solution, and then the solvent is distilled to obtain 3,5,6-trialkylbenzene-1,2,4-tricarboxylic acid.

Acetic acid and acetic anhydride are added to the 3,5,6-trialkylbenzene-1,2,4-tricarboxylic acid, and this is then reacted at 50~130° C. for 30 minutes to 24 hours, to obtain 3,5,6-trialkyl-4-carboxylic acid-1,2-phthalic anhydride.

A halogenation reagent such as thionyl chloride is added to the 3,5,6-trialkylalkyl-4-carboxylic acid-1,2-phthalic anhydride, and is reacted for 30 minutes to 48 hours to obtain 3,5,6-trialkyl-4-halogenformyl-1,2-phthalic anhydride.

To prepare a polyamideimide, first, the 3,5,6-trialkyl-4-halogenformyl-1,2-phthalic anhydride, A, and a diamine compound, B, are dissolved in a polar solvent, and reacted at −20~50° C. for 300 hours. Here, as the polar solvent, N,N-dimethylformamide, N,N-dimethylacetamide, N,N-dimethylsulfoxide or N-methyl-2-pyrrolidone is used.

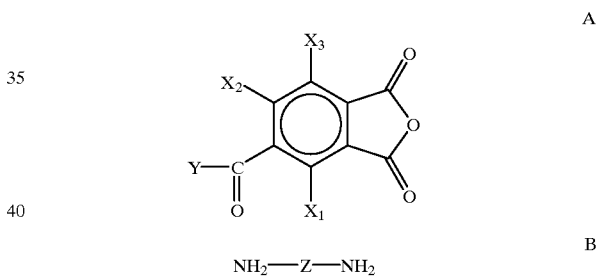

The reaction mixture is precipitated in distilled water or an organic solvent such as methylalcohol, to form polyamideamic acid that is an intermediate. The polyamideamic acid is imidized to prepare the polyamideimide.

Imidization of the polyamideamic acid into the polyamideimide can be performed by a chemical method or a thermal method. In the chemical method, acetic anhydride and pyridine are added to a mixture containing 3,5,6-trialkyl-4-halogenformyl-1,2-phthalic anhydride, A, and a diamine compound, B, and heated at 60~150° C. Otherwise, toluene is added to the mixture containing the 3,5,6-trialkyl-4-halogenformyl-1,2-phthalic anhydride, A, and a diamine compound, B, and heated to the boiling point of toluene. In the thermal method, the polyamideamic acid is heated by steps within a temperature range of approximately 50~400° C. Imidization of polyamideamic acid into polyamideimide can be measured by a thermogravimetry analysis (TGA) method at 200~250° C., and thermal decomposition occurs at 300–500° C. specifically at 375~425° C.

The polyamideimide according to the present invention, obtained by the above method, has a glass transition temperature of 220~320° C. and a molecular weight of $5\times10^3$–$4\times10^5$ Dalton. Here the molecular weight of the polyamideimide is determined using gel permeation chromatography.

The diamine compound, B, is not limited to a specific compound. For example, the diamine compound B may be a bis(perfluorophenyl)alkane, bis(perfluorophenyl)sulfone, bis,perfluorophenyl)ether or αα'-bis(perfluorophenyl) diisopropylbenzene. Examples of diamine compound B include tetrafluoro-1,2-phenylenediamine, tetrafluoro-1,3-phenylendiamine, tetafluoro-1,4-phenyldiamine, tetrachloro-1,2-phenylenediamine, tetrachloro-1,3-phenylenediamine, tetrachloro-1,4-phenylenediamine, hexafluoro-1,5-diaminonaphthalene, hexafluoro-2,6-diaminonaphthalene, 3-trifluoromethyltrifluoro-1,2-phenylenediamine, 4-trifluoromethyltrifluoro-1,2-phenylenediamine, 2-trifluoromethyltrifluoro-1,3-phenylenediamine, 4-trifluoromethyltrifluoro-1,3-phenylenediamine, 5-trifluoromethyltrifluoro-1,3-phenylenediamine, 2-trifluoromethyltrifluroo-1,4-phenylenediamine, 3-pentafluoroethyltrifluoro-1,2-phenylenediamine, 4-pentafluoroethyltrifluoro-1,2-phenylenediamine, 2-pentafluoroethyltrifluoro-1,3-phenylenediamine, 4-pentafluoroethyltrifluoro-1,3-phenylenediamine, 5-pentafluoroethyltrifluoro-1,3-phenylenediamine, 2-pentafluoroethyltrifluoro-1,4-phenylenediamine, 3,4-bis(trifluoromethyl)difluoro-1,2-phenylenediamine, 3,5-bis(trifluoromethyl)difluoro-1,2-phenylenediamine, 2,4-bis(trifluoromethyl)difluoro-1,3-phenylenediamine, 4,5-bis(trifluoromethyl)difluoro-1,3-phenylenediamine, 2,3-bis(trifluoromethyl)difluoro-1,4-phenylenediamine, 2,5-bis(trifluoromethyl)difluoro-1,4-phenylenediamine, 3,4-bis(trifluoromethyl)difluoro-1,2-phenylenediamine, 3-trifluoromethoxytrifluoro-1,2-phenylenediamine, 4-trifluoromethoxytrifluoro-1,2-phenylenediamine, 2-trifluoromethoxytrifluoro1,3-phenylenediamine, 4-trifluoromethoxytrifluoro-1,3-phenylenediamine, 5-trifluoromethoxytrifluoro-1,3-phenylenediamine, 2-trifluoromethoxytfluoro-1,4-phenylenediamine, 3,4,5-tris(trifluoromethyl)fluoro-1,2-phenylenediamine, 3,4,6-tris(trifluoromethyl)fluoro-1,2-phenylenediamine, phenylenediamine, 2,4,5-tris (trifluoromethyl)fluoro-1,3-phenylenediamine, 2,4,6-tris (trifluoromethyl)fluoro-1,3-phenylenediamine, 4,5,6-tris (trifluoromethyl)fluoro-1,3-phenylenediamine, tetrakis (trifluoromethyl)-1,2-phenylenediamine, tetrakis (trifluoromethyl)-1,3-phenylenediamine, tetrakis (trifluoromethyl)-1,4-phenylenediamine, 3,3'-diaminooctafluorobiphenyl, 3,4'-diaminooctafluorobiphenyl,4,4'-diaminooctafluorobiphenyl, 3,3'-diaminooctachlorobiphenyl, 3,4'-diaminooctachlorobiphenyl, 4,4'-diaminooctachlorobiphenyl, 2,2'-bis(trichloromethyl)-4,4'-diaminohexachlorobiphenyl, 3,3'-bis(trichloromethyl)-4,4'-diaminohexafluorobiphenyl, bis(4-amiotetrafluorophenyl) dichloromethane, 1,2-bis(4-aminotetrafluorophenyl) tetrachloroethane,2,2-bis(4-aminotetrafluorophenyl) hexachloropropane, 2,2'-bis(trifluoromethyl)-4,4'-diaminohexachlorobiphenyl, 3,3'-bis(trifluoromethyl)-4,4'-diaminohexafluorobiphenyl, bis(4-aminotetrafluorophenyl) difluoromethane, 1,2-bis(4-aminotetrafluorophenyl) tetrachloroethane, 2,2-bis(4-aminotetrafluorophenyl) hexafluoropropane, bis(3-aminotetrafluorophenyl)ether, 3,4'-diaminooctafluorobiphenylether, bis(4-aminotetrafluorophenyl)ether, bis(3-aminotetrachlorophenyl)ether, 3,4'-diaminooctachlorobiphenylether, bis(4-aminotetrachlorophenyl)ether, 3,3'-diaminooctafluorobenzophenone, 3,4'-diaminooctafluorobenzophenone, 4,4'-diaminooctafluorobenzophenone, bis(3-aminotetrafluorophenyl)sulfone, 3,4'-diaminooctafluorobiphenylsulfone, bis(4-aminotetrafluorophenylsulfone), bis(3-aminotetrafluorophenyl)sulfide, 3,4'-diaminooctafluorobiphenylsulfide, bis(4-aminotetrafluorophenyl)sulfide, 4-aminotetrafluorophenoxy-4'-aminotetrafluorophenyldifluoromethane, bis(4-aminotetrafluorophenoxy)difluoromethane, 1,2-bis(4-aminotetrafluorophenoxy)tetrafluoroethane, 2,2-bis(4-aminotetrafluorophenoxy)hexafluoropropane, bis(4-aminotetrafluorophenoxy)dichloromethane, 1,2-bis(4-aminotetrafluorophenoxy)tetrachloroethane, 2,2-bis(4-aminotetraflurophenoxy)hexachloropropane, 4,4"-diaminododecafluoro-p-terphenyl, 2',3'-bis(trifluoromethyl)-4,4"-diamino-p-terphenyl,2,2"-bis(trifluoromethyl)-4,4"-diamino-p-terphenyl, 2',5'-bis(trifuoromethyl,)-4,4"-diamino-p-terphenyl,2,7-diaminohexafluorodibenzofuran, 1,4-bis(4-aminotetrafluorophenoxy)tetrafluorobenzene, 2,6-diaminohexafluoronaphthalene, 2,7-diaminooctafluorophenanthrene, 2,6-diaminooctafluoroanthracene, 2,7-diaminohexathianthrene, 2,6-diaminohexafluoroanthraquinone, 2,6-diaminohexafluorobiphenylene, 2,6-diaminooxtafluoroanthrone,2,7-diaminotetrafluorodibenz[b,e]1,4-dioxane,2,2'-bis(4-aminophenyl) hexafluoropropane, 2,2'-bis(4-aminophenyl) hexachloropropane, 2,4-diaminobenzotrifluoride, 2,2-bis(trifluoromethyl)benzidine,2,2-bis[4-(4-amino-2-trifluorophenoxy)phenyl]hexafluoropropane, 2,2-bis[4-(4-amino-2-trifluorophenoxy)phenyl]hexachloropropane,3,4-diaminobenzotrifluoride,3,5-diaminobenzotrifluoride, 2,5-diaminobenzotrifluoride, 2,2-bis [4-(4-aminophenoxy) phenyl]hexafluoropropane, 2,2-bis[4-(4-amino phenoxy) phenyl]hexachloropropane, or 3,4-diamino-1-fluorobenzene.

Hereinafter, the present invention will be described in detail through the following examples. However, the present invention is not limited to the following examples.

EXAMPLE 1

0.001 mol of 3,5,6-trichloro-4-chloroformyl-1,2-phthalic acid anhydride, 0.001 mol of 1,3-phenylenediamine and 3 ml of N,N-dimethylacetamide were reacted under a nitrogen atmosphere at room temperature for 9 days.

The reaction mixture was added to distilled water to form a precipitate. The obtained precipitate was filtered and washed with distilled water several times. Then, the resultant was dried in a vacuum oven set to 60° C. for 24 hours, and heated to 250° C., resulting in polyamideimide PAI (1) (yield: 90%).

EXAMPLE 2

A mixture containing 0.001 mol of 3,5,6-trichloro-4-chloroformyl-1,2-phthalic acid anhydride, 0.001 mol of 4,4'-diaminobiphenyl and 4 ml of N,N-dimethylacetamide was reacted under a nitrogen atmosphere at room temperature for 7 days.

The reaction mixture was added to distilled water to obtain a precipitate. Then, the obtained precipitate was filtered and washed with distilled water several times. The resultant was dried in a vacuum oven set to 60° C. for 24 hours, and heated to 250° C., resulting in polyamideimide PAI (2) (yield: 88%).

EXAMPLE 3

A mixture containing 0.001 mol of 3,5,6-trichloro-4-chloroformyl-1,2-phthalic acid anhydride, 0.001 mol of 1,5-diaminonaphthalene and 4 ml of N,N-dimethylacetamide was reacted under a nitrogen atmosphere at room temperature for 9 days.

The reaction mixture was added to distilled water to form a precipitate. The obtained precipitate was filtered and washed with distilled water several times. Then, the resultant was dried in a vacuum oven set to 60° C. for 24 hours, acetic anhydride and pyridine were then added thereto and heated.

The reaction mixture was mixed with distilled water to form a precipitate, and the precipitate was filtered. The resultant was washed with distilled water several times, and dried in a vacuum oven set to 60° C. for 24 hours, resulting in polyamideimide PAI (3) (yield: 84%)

EXAMPLE 4

A mixture containing 0.001 mol of 3,5,6-trichloro-4-chloroformyl-1,2-phthalic acid anhydride, 0.001 mol of tetrafluoro-1,3-phenylenediamine and 5 ml of N,N-dimethylacetamide was reacted under a nitrogen atmosphere at room temperature for 9 days.

The reaction mixture was added to distilled water to form a precipitate. The obtained precipitate was filtered and washed with distilled water several times. Then, the resultant was dried in a vacuum oven set to 60° C. for 24 hours, acetic anhydride and pyridine were then added thereto and heated.

The reaction mixture was mixed with distilled water to form a precipitate, and the precipitate was filtered. The resultant was washed with distilled water several times, and dried in a vacuum oven set to 60° C. for 24 hours, resulting in polyamideimide PAI (4) (yield: 85%)

EXAMPLE 5

A mixture containing 0.001 mol of 3,5,6-trichloro-4-chloroformyl-1,2-phthalic acid anhydride, 0.001 mol of 4,4'-diaminooctafluorobiphenyl and 3 ml of N,N-dimethylacetamide was reacted under a nitrogen atmosphere at room temperature for 9 days.

The reaction mixture was added to distilled water to form a precipitate. The obtained precipitate was filtered and washed with distilled water several times. Then, the resultant was dried in a vacuum oven set to 60° C. for 24 hours, acetic anhydride and pyridine were then added thereto and heated.

The reaction mixture was mixed with distilled water to form a precipitate, and the precipitate was filtered. The resultant was washed with distilled water several times, and dried in a vacuum oven set to 60° C. for 24 hours, resulting in polyamideimide PAI (5) (yield: 83%)

EXAMPLE 6

A mixture containing 0.001 mol of 3,5,6-trichloro-4-chloroformyl-1,2-phthalic acid anhydride, 0.001 mol of bis (4-aminophenyl) methane and 4 ml of N,N-dimethylacetamide was reacted at room temperature for 9 days.

The reaction mixture was added to distilled water to form a precipitate. The obtained precipitate was filtered and washed with distilled water several times. Then, the resultant was dried in a vacuum oven set to 60° C. for 24 hours.

The obtained product was heated to 250° C., resulting in polyamideimide PAI (6) (yield: 82%)

EXAMPLE 7

A mixture containing 0.001 mol of 3,5,6-trichloro-4-chloroformyl-1,2-phthalic acid anhydride, 0.001 mol of bis (4-aminotetrafluorophenyl)difluoromethane and 3 ml of N,N-dimethylacetamide was reacted at room temperature for 9 days.

The reaction mixture was added to distilled water to form a precipitate. The obtained precipitate was filtered and washed with distilled water several times. Then, the resultant was dried in a vacuum oven set to 60° C. for 24 hours, acetic anhydride and pyridine were then added thereto and heated.

The reaction mixture was mixed with distilled water to form a precipitate, and the precipitate was filtered. The resultant was washed with distilled water several times, and dried in a vacuum oven set to 60° C. for 24 hours, resulting in polyamideimide PAI (7) (yield: 80%).

EXAMPLE 8

A mixture containing 0.001 mol of 3,5,6-trichloro-4-chloroformyl-1,2-phthalic acid anhydride, 0.001 mol of 2,2-bis (4-aminophenyl) propane and 3 ml of N,N-dimethylacetamide was reacted under a nitrogen atmosphere at room temperature for 9 days.

The reaction mixture was added to distilled water to form a precipitate. The obtained precipitate was filtered and washed with distilled water several times. Then, the resultant was dried in a vacuum oven set to 60° C. for 24 hours, acetic anhydride and pyridine were then added thereto and heated.

The reaction mixture was mixed with distilled water to form a precipitate, and the precipitate was filtered. The resultant was washed with distilled water several times, and dried in a vacuum oven set to 60° C. for 24 hours, resulting in polyamideimide PAI (8) (yield: 81%).

EXAMPLE 9

A mixture containing 0.001 mol of 3,5,6-trichloro-4-chloroformyl-1,2-phthalic acid anhydride, 0.001 mol of 2,2-bis (4-aminophenyl) hexachloropropane and 4 ml of N,N-dimethylacetamide was reacted under a nitrogen atmosphere at room temperature for 9 days.

The reaction mixture was added to distilled water to form a precipitate. The obtained precipitate was filtered and washed with distilled water several times. Then, the resultant was dried in a vacuum oven set to 60° C. for 24 hours and heated to 250° C., resulting in polyamideimide PAI (9) (yield: 80%).

EXAMPLE 10

A mixture containing 0.001 mol of 3,5,6-trichloro-4-chloroformyl-1,2-phthalic acid anhydride, 0.001 mol of 2,2-bis (4-aminotetrafluorophenyl) hexafluoropropane and 3 ml of N,N-dimethylacetamide was reacted under a nitrogen atmosphere at room temperature for 9 days.

The reaction mixture was added to distilled water to form a precipitate. The obtained precipitate was filtered and washed with distilled water several times. Then, the resultant was dried in a vacuum oven set to 60° C. for 24 hours and heated to 250° C., resulting in polyamideimide PAI (10) (yield: 73%).

EXAMPLE 11

A mixture containing 0.001 mol of 3,5,6-trichloro-4-chloroformyl-1,2-phthalic acid anhydride, 0.001 mol of 2,2'-bis(4-aminotetrafluorophenyl) hexachloropropane and 5 ml of N,N-dimethylacetamide was reacted under a nitrogen atmosphere at room temperature for 9 days.

The reaction mixture was added to distilled water to form a precipitate. The obtained precipitate was filtered and washed with distilled water several times. Then, the resultant was dried in a vacuum oven set to 60° C. for 24 hours and heated to 250° C., resulting in polyamideimide PAI (11) (yield: 75%).

EXAMPLE 12

A mixture containing 0.001 mol of 3,5,6-trichloro-4-chloroformyl-1,2-phthalic acid anhydride, 0.001 mol of bis (4-aminophenyl) ether and 5 ml of N,N-dimethylacetamide was reacted under a nitrogen atmosphere at room temperature for 9 days.

The reaction mixture was added to distilled water to form a precipitate. The obtained precipitate was filtered and washed with distilled water several times. Then, the resultant was dried in a vacuum oven set to 60° C. for 24 hours and heated to 250° C., resulting in polyamideimide PAI (12) (yield: 88%).

EXAMPLE 13

A mixture containing 0.001 mol of 3,5,6-trichloro-4-chloroformyl-1,2-phthalic acid anhydride, 0.001 mol of bis (4-aminotetrachlorophenyl) ether and 5 ml of N,N-dimethylacetamide was reacted under a nitrogen atmosphere at room temperature for 9 days.

The reaction mixture was added to distilled water to form a precipitate. The obtained precipitate was filtered and washed with distilled water several times. Then, the resultant was dried in a vacuum oven set to 60° C. for 24 hours, acetic anhydride and pyridine were then added thereto and heated.

The reaction mixture was mixed with distilled water to form a precipitate, and the precipitate was filtered. The resultant was washed with distilled water several times, and dried in a vacuum oven set to 60° C. for 24 hours, resulting in polyamideimide PAI (13) (yield: 81%).

EXAMPLE 14

A mixture containing 0.001 mol of 3,5,6-trichloro-4-chloroformyl-1,2-phthalic acid anhydride, 0.001 mol of bis (4-aminotetrafluoro) sulfone and 5 ml of N,N-dimethylacetamide was reacted under a nitrogen atmosphere at room temperature for 9 days.

The reaction mixture was added to distilled water to form a precipitate. The obtained precipitate was filtered and washed with distilled water several times. Then, the resultant was dried in a vacuum oven set to 60° C. for 24 hours, acetic anhydride and pyridine were then added thereto and heated.

The reaction mixture was mixed with distilled water to form a precipitate, and the precipitate was filtered. The resultant was washed with distilled water several times, and dried in a vacuum oven set to 60° C. for 24 hours, resulting in polyamideimide PAI (14) (yield: 61%).

EXAMPLE 15

A mixture containing 0.001 mol of 3,5,6-trichloro-4-chloroformyl-1,2-phthalic acid anhydride, 0.001 mol of 2,2'-bis (4-trifluoromethyl) benzidine and 5 ml of N,N-dimethylacetamide was reacted under a nitrogen atmosphere at room temperature for 9 days.

The reaction mixture was added to distilled water to form a precipitate. The obtained precipitate was filtered and washed with distilled water several times. Then, the resultant was dried in a vacuum oven set to 60° C. for 24 hours, acetic anhydride and pyridine were then added thereto and heated.

The reaction mixture was mixed with distilled water to form a precipitate, and the precipitate was filtered. The resultant was washed with distilled water several times, and dried in a vacuum oven set to 60° C. for 24 hours, resulting in polyamideimide PAI (15) (yield: 73%).

Thermal stability, optical loss at a near infrared wavelength range of 1,000–1,700 nm, and film processibility of each of the polyamideimides PAI (1) through (15) synthesized by Examples 1 through 15 were measured. The thermal stability of the polyamideimides was measured using a thermogravimetry analysis (TGA) method. As a result, it could be seen that the thermal stability was good from the fact that the PAIs 1 through 15 were thermally-decomposed at 350–450° C. Also, it was observed that the optical loss of the polyamideimide was similar to or less than the conventional perfluorinated polyimide.

Also, since the conventional partially fluorinated or perfluorinated polyamideimide had a very poor film processibility, it is impossible to use substantially it for an optical material. On the other hand, the polyamideimides obtained by Examples 1 through 15 had an improved film processibility compared to the conventional polyimide.

The polyamideimide according to the present invention has a higher refractive index than the conventional fluorinated polyimide. Thus, when using such polyamideimide as a material for a core of an optical waveguide, the selection range on the material for cladding becomes wide. Also, the coating property and adhesion to a substrate are improved compared to the conventional polyimide, thereby providing a good film processibility and thermal stability.

Also, since the polyamideimide according to the present invention can minimize optical loss at a near infrared wavelength range, the polyamideimide of the present invention is very useful as an optical material in the optical communications field adopting the light of near infrared wavelength.

That is, the polyamideimide according to the present invention can be used as a functional polymeric material having a low optical loss characteristic which is essential for manufacturing an optical device for optical waveguiding, such as optoelectronic integrated circuit (OEIC), optoelectrical mixed wiring board (OEMWB), hybrid integration device, multi-chip module (CM) or plastic optical fiber.

What is claimed is:

1. A polyamideimide for optical communications, comprising a monomer represented by the formula:

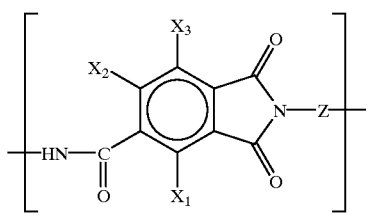

as a repeating unit; wherein $X_1$, $X_2$ and $X_3$ are independently selected from the group consisting of halogen atom, halogenated alkyl group, halogenated aromatic ring group, $-NO_2$, $-OR^1$ and $-SR^1$, where $R^1$ is a halogenated alkyl group or a halogenated aromatic ring group; and where Z is selected from the group consisting of divalent halogenated aliphatic hydrocarbon, divalent halogenated aliphatic cyclic hydrocarbon or divalent halogenated aromatic hydrocarbon.

2. The polyamideimide according to claim 1, wherein $X_1$, $X_2$ and $X_3$ are the same and selected from the group consisting of chloride, partially chlorinated or perchlorinated alkyl group, partially chlorinated or perchlorinated aromatic ring group, partially chlorinated or perchlorinated alkoxy group, and partially chlorinated or perchlorinated phenoxy group.

3. The polyamideimide according to claim 1, wherein Z is selected from the group consisting of divalent halogenated aliphatic hydrocarbon of $C_1$–$C_{25}$, divalent halogenated aliphatic aromatic hydrocarbon of $C_1$–$C_{25}$, and divalent halogenated aromatic hydrocarbon of $C_6$–$C_{25}$.

4. The polyamideimide according to claim 1, wherein Z is represented by the following formula:

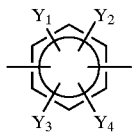

wherein $Y_1$, $Y_2$, $Y_3$, and $Y_4$ are independently selected from the group consisting of halogen atom, halogenated alkyl group, halogenated aromatic ring group, $-NO_2$, $-OR^1$ and $-SR^1$, where $R^1$ is a halogenated alkyl group or a halogenated aromatic ring group.

5. The polyamideimide according to claim 1, wherein Z is represented by the following formula:

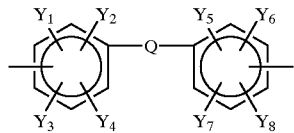

wherein $Y_1$, $Y_2$, $Y_3$, $Y_4$, $Y_5$, $Y_6$, $Y_7$ and $Y_8$ are independently selected from the group consisting of halogen atom, halogenated alkyl group, halogenated aromatic ring group, $-NO_2$, $-OR^1$ and $-SR^1$, where $R^1$ is a halogenated alkyl group or a halogenated aromatic ring group; and Q is a simple chemical bond or selected from the group consisting of $-O-$, $-CO-$, $-SO_2-$, $-S-$, $-(OT)m-$, and $-(OTO)m-$; where T is a halogenated alkylene or halogenated arylene group and m is an integer in the range of 1 to 10.

6. The polyamideimide of claim 1, wherein the polyamideimide has a molecular weight in the range of approximately $1\times10^4$ to $4.5\times10^4$ Dalton.

7. The polyamideimide of claim 1, wherein the polyamideimide has a thermal decomposition temperature in the range of approximately 300~500° C.

8. The polyamideimide of claim 1, wherein the polyamideimide has a glass transition temperature in the range of approximately 220~320° C.

9. A method for preparing a polyamideimide for optical communications, comprising the steps of:
(a) reacting a 3,5,6-trialkyl-4halogenformyl-1,2-phthalic acid anhydride of formula:

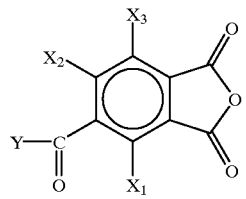

with a diamine compound of formula:

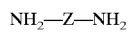

$NH_2-Z-NH_2$ at a temperature in the range of approximately −20 to 50° C., and then precipitating the reaction mixture using distilled water or an organic solvent, to obtain a polyamideamic acid as an intermediate; and
(b) imidizing the polyamideamic acid;
wherein $X_1$, $X_2$ and $X_3$ are independently selected from the group consisting of halogen atom, halogenated alkyl group, halogenated aromatic ring group, $-NO_2$, $-OR^1$ and $-SR^1$, where $R^1$ is a halogenated alkyl group or a halogenated aromatic ring group; Z is selected from the group consisting of divalent halogenated aliphatic hydrocarbon, divalent halogenated aliphatic cyclic hydrocarbon and divalent halogenated aromatic hydrocarbon; and Y is a halogen atom.

10. The method of claim 9, wherein in step (a), said 3,5,6-trialkyl-4-halogenformyl-1,2-phthalic acid is reacted with said diamine compound at a temperature in the range of approximately 5 to 20° C. for a time period in the range of approximately 100~230 hours.

11. The method of claim 9, wherein in the step (b), said polyamideamic acid is either:
mixed with acetic anhydride and pyridine and then heated at a temperature of approximately 60 to 150° C.;
or toluene is added to the polyamideamic acid and the mixture heated to the boiling point of the toluene.

12. The method of claim 9, wherein in the step (b), said polyamideamic acid is heated by steps in a temperature range of between approximately 50 and 400° C.

13. A polymer made by a process comprising the steps of:
allowing 3,5,6-trichloro-4-chloroformyl-phthalic acid anhydride to react for an amount of time with a diamine compound in the presence of N,N-dimethylacetamide, and under nitrogen atmosphere, to create a reaction mixture;
adding said reaction mixture to a polar solvent, collecting a precipitate, and washing the precipitate;
drying said precipitate; and
imidizing said precipitate to form a polyamideimide.

14. The polymer of claim 13, where said diamine compound is a compound selected from the group consisting of 1,3-phenylenediamine, 4,4'-diaminobiphenyl, 1,5-diaminonaphthalene, tetrafluoro-1,3-phenylenediamine, 4,4'-diaminooctafluorobiphenyl, bis(4-aminophenyl) methane, bis(4-aminotetrafluorophenyl)difluoromethane, 2,2-bis(4-aminophenyl)propane, 2,2-bis(4-aminophenyl) hexachloropropane, 2,2-bis(4-aminotetrafluorophenyl) hexafluoropropane, 2,2-bis(4-aminotetrafluorophenyl) hexachloropropane, bis(4-aminophenyl)ether, bis(4-aminotetrafluorophenyl)ether, bis(4-aminotetrafluoro) sulfone and 2,2'-bis(4—7trifluoromethyl)benzidine.

* * * * *